US010261904B2

(12) United States Patent
Zhang et al.

(10) Patent No.: US 10,261,904 B2
(45) **Date of Patent: *Apr. 16, 2019**

(54) MEMORY SEQUENCING WITH COHERENT AND NON-COHERENT SUB-SYSTEMS

(71) Applicant: Intel Corporation, Santa Clara, CA (US)

(72) Inventors: Chunhui Zhang, Hillsboro, OR (US); George Z. Chrysos, Portland, OR (US); Edward T. Grochowski, San Jose, CA (US); Ramacharan Sundararaman, Hillsboro, OR (US); Chung-Lun Chan, Hillsboro, OR (US); Federico Ardanaz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,384

(22) Filed: Dec. 7, 2017

(65) Prior Publication Data

US 2018/0173628 A1 Jun. 21, 2018

Related U.S. Application Data

(63) Continuation of application No. 14/327,109, filed on Jul. 9, 2014, now Pat. No. 9,875,185.

(51) Int. Cl.

*G06F 9/38* (2018.01)
*G06F 12/0806* (2016.01)
(Continued)

(52) U.S. Cl.

CPC ........... *G06F 12/0842* (2013.01); *G06F 9/38* (2013.01); *G06F 12/0828* (2013.01);
(Continued)

(58) Field of Classification Search

CPC ............. G06F 12/0842; G06F 12/0806; G06F 12/0815; G06F 12/0828; G06F 12/0835;
(Continued)

(56) References Cited

U.S. PATENT DOCUMENTS 9,875,185 B2 * 1/2018 Zhang ................ G06F 12/0842
2003/0217239 A1 11/2003 Jeddeloh
(Continued)

FOREIGN PATENT DOCUMENTS

CN 1490730 A 4/2004
CN 1669011 A 9/2005
(Continued)

*Primary Examiner* — Shane D Woolwine
(74) *Attorney, Agent, or Firm* — Lowenstein Sandler LLP

(57) ABSTRACT

Operations associated with a memory and operations associated with one or more functional units may be received. A dependency between the operations associated with the memory and the operations associated with one or more of the functional units may be determined. A first ordering may be created for the operations associated with the memory. Furthermore, a second ordering may be created for the operations associated with one or more of the functional units based on the determined dependency and the first operating of the operations associated with the memory.

18 Claims, 14 Drawing Sheets

300

Identify a series of memory operations
310

Identify a series of NOCO trigger operations
320

Create a dependency for a NOCO trigger operation based on the series of memory operations
330

Execute the memory operations and the NOCO trigger operations
340

(51) Int. Cl.

| | |
|---|---|
| ***G06F 12/0815*** | (2016.01) |
| ***G06F 12/0817*** | (2016.01) |
| ***G06F 12/0831*** | (2016.01) |
| ***G06F 12/0842*** | (2016.01) |

(52) U.S. Cl.

CPC ...... *G06F 12/0835* (2013.01); *G06F 12/0806* (2013.01); *G06F 12/0815* (2013.01); *G06F 2212/1016* (2013.01); *G06F 2212/283* (2013.01); *G06F 2212/621* (2013.01)

(58) Field of Classification Search

CPC ......... G06F 2212/283; G06F 2212/621; G06F 2212/1016; G06F 9/38

USPC ................................ 711/141, 151, 152, 158

See application file for complete search history.

(56) References Cited

U.S. PATENT DOCUMENTS

| | | | |
|---|---|---|---|
| 2006/0026371 | A1 | 2/2006 | Chrysos et al. |
| 2009/0240895 | A1 | 9/2009 | Nyland et al. |
| 2013/0024630 | A1 | 1/2013 | Campbell et al. |
| 2013/0346698 | A1 | 12/2013 | Waugh et al. |

FOREIGN PATENT DOCUMENTS

| | | | |
|---|---|---|---|
| CN | 1728087 | A | 2/2006 |
| CN | 101916227 | B | 4/2015 |
| WO | 2013162594 | A1 | 10/2013 |

* cited by examiner

MEMORY SEQUENCING WITH COHERENT AND NON-COHERENT SUB-SYSTEMS

RELATED APPLICATION

This continuation application claims priority to U.S. patent application Ser. No. 14/327,109 filed on Jul. 9, 2014, which is hereby incorporated by reference herein.

TECHNICAL FIELD

Embodiments described herein generally relate to memory sequencing and, more specifically, relate to memory sequencing with coherent and non-coherent subsystems.

BACKGROUND

A processing device may be based on an architecture that includes memory and functional units. A processor core of the processing device may assign processing tasks or functions to the functional units. For example, the processing core may store data in the memory and may further issue a command for a functional unit to perform an operation on the data after it has been stored in the memory.

DESCRIPTION OF EMBODIMENTS

Figure 1:
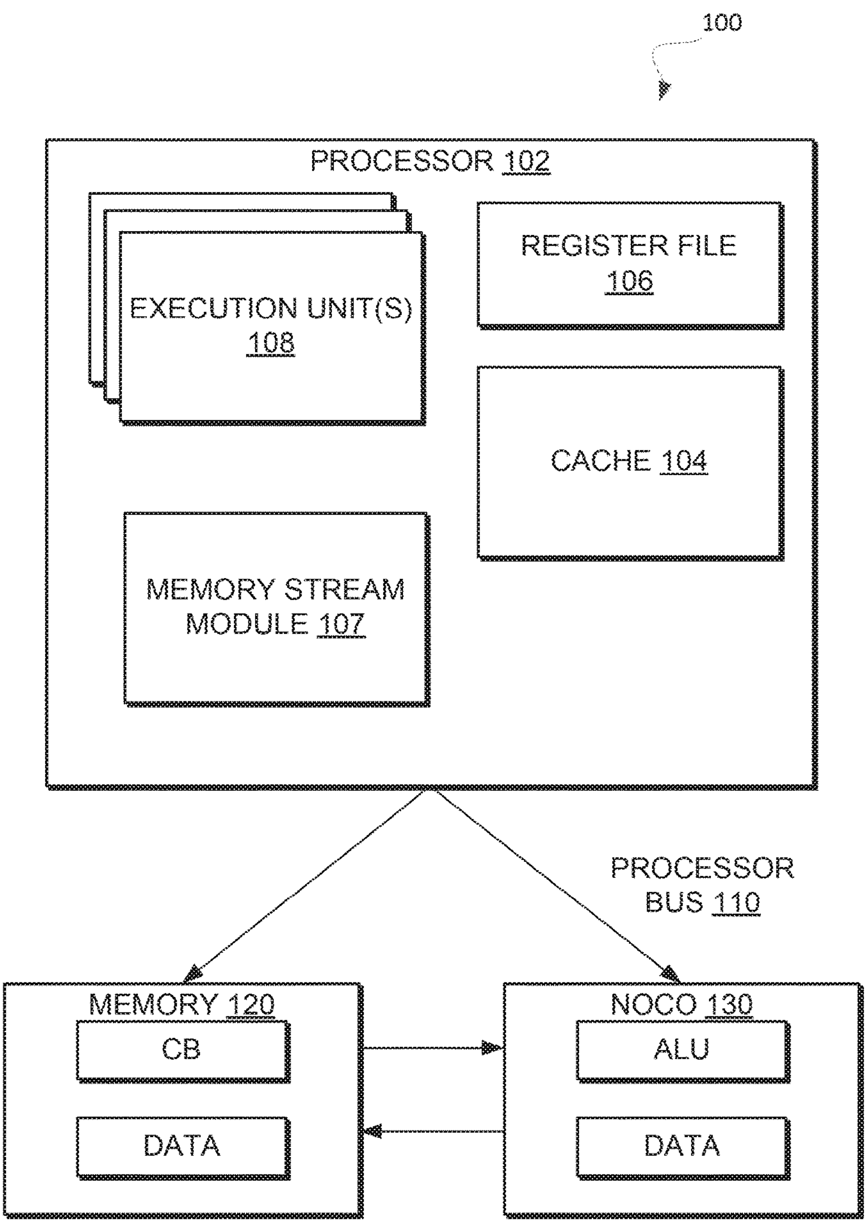
FIG. 1 is a block diagram illustrating a computing system that implements a memory stream module to provide memory ordering or sequencing in accordance with some embodiments.

Aspects of the present disclosure are directed to a memory sequencing technology in a processing architecture with coherent and non-coherent subsystems or portions. The memory sequencing technology may be used to improve the performance of a processor, processing device, or a processor-based system. For example, the memory sequencing technology may be used to improve the performance of a processing device by defining properties that are enforced among operations (e.g., memory read transactions and memory write transactions) among different parts of the processing device. A processing device may include a processor core, multiple functional units, and a memory. The processor core may offload a task to be performed by a functional unit. For example, the processor core may issue a first operation corresponding to storing an instruction or command and data in the memory and may issue a second operation corresponding to transmitting a command (i.e., a trigger) to a functional unit to perform a function or operation on the data based on the instruction or command stored in the memory. The processing device may include a memory stream module that includes function blocks that may be used to define dependencies for operations associated with one or more functional units based on operations associated with the memory of the processing device.

A processing device may include a non-coherent sub-system or portion and a coherent sub-system or portion. For example, the memory of the processing device may be a part of the coherent sub-system and one or more functional units may be a part of the non-coherent sub-system. Such a memory may be referred to as coherent memory and such a functional unit may be referred to as a non-coherent (NOCO) functional unit. The NOCO functional units may be a functional unit that is outside of a processor core. For example, the processor core may include functional units and the NOCO functional units may be external to the processor core. A NOCO functional unit may also be referred to as an accelerator or a fixed-function block. Coherent and non-coherent may refer to a consistency model. In some embodiments, the consistency model may define rules for memory operations (e.g., the write transactions to memory and read transactions by functional units to retrieve data from the memory). For example, a coherent memory may refer to a memory that is read and/or written to by one or more execution or functional units or processors and a non-coherent functional unit may refer to a functional unit that stores or is associated with a separate copy of data that is separate from the coherent memory. Such a functional unit may also be referred to as an accelerator. Thus, a processing device that includes both a coherent memory and one or more non-coherent functional units may be referred to as a coherent and non-coherent system. In some embodiments, an operation associated with the coherent memory may be referred to as a memory operation (e.g., a read or write transaction for the coherent memory) and an operation associated with a non-coherent functional unit may be referred to as a NOCO trigger. Accordingly, since the NOCO functional units and the coherent memory are operating on separately stored copies of the same data, the execution of operations using the data may require certain dependencies in order to maintain the defined rules for the operations.

Modern microprocessor-based products, including a System on a Chip (SoC), clients, servers, and hardware accelerators, may utilize a processing architecture that includes coherent memory and non-coherent functional units. A memory sequencing module may be used to define interactions between the operations associated with the coherent memory and the operations associated with the non-coherent functional units. In some embodiments, the memory sequencing module may be used to define a dependency between an operation for the NOCO functional unit (e.g., the NOCO trigger) and an operation for the coherent memory (e.g., the memory operation). In some embodiments, the NOCO trigger may be a command for the NOCO functional unit to retrieve commands or instructions stored in the coherent memory. Such commands or instructions stored in the coherent memory may be referred to as a control block (CB). Thus, a first operation (e.g., the memory operation) from a processor core may correspond to the writing or reading of a control block to the coherent memory and a second operation (e.g., a NOCO trigger) from the processor core may correspond to the reading and retrieving of the control block from the coherent memory and subsequent operations to be performed by the NOCO functional unit. As such, the NOCO trigger for the NOCO functional unit may be dependent upon the coherent memory operation. In some embodiments, such a dependency may refer to the NOCO trigger for the NOCO functional unit not being executed or transmitted to the NOCO functional unit by the processing core until a particular memory operation for the coherent memory has been completed.

As described in further detail below, the memory stream module may provide a first stream or sequence of memory operations for the coherent memory and a second stream or sequence of NOCO triggers for the NOCO functional units. In some embodiments, the second stream or sequence of NOCO triggers for the NOCO functional units may be dependent upon the first stream or sequence of memory operations for the coherent memory. For example, a trigger for a NOCO functional unit may be restricted from being executed before an older memory operation (e.g., a read transaction that was issued earlier) for the coherent memory has been executed.

Such an ordering between memory operations for the coherent memory and triggers for the NOCO functional units may improve the overall performance of a processing device that includes both coherent sub-systems and non-coherent sub-systems. For example, the consistency model used by the memory stream module may create a first stream for the coherent memory where the first stream may allow out of order execution of operations (e.g., a particular transaction may be executed before an earlier transaction) while having another stream for the NOCO functional units to execute in a more sequential and in-order manner while also being partly dependent on a memory operation. Such a consistency model may allow for faster execution of memory operations while also utilizing NOCO functional units.

FIG. 1 is a block diagram illustrating a computing system 100 that implements a memory stream module 107 for providing and updating memory sequences associated with a memory 120 and one or more NOCO functional units 130 in accordance with some embodiments. The computing system 100 is formed with a processor 102 that includes a processing core that may offload jobs or transactions to be completed by one or more of the NOCO functional units 130. In short, the memory stream module 107 maintains and updates memory sequences for the memory 120 and for the NOCO functional units 130 that may be used to define when memory operations for the memory 120 and/or NOCO triggers for the NOCO functional units 130 may be executed. For example, the memory stream module 107 may define and control a particular order for the execution of memory operations for the memory 120 as well as for the NOCO triggers for the NOCO functional units 130 as well as define and enforce a dependency for a NOCO trigger for the NOCO functional units 130 based on a memory operation for the memory 120. Additional details with regard to the memory stream module 107 are described in more detail below with respect to FIGS. 2-6.

Computing system 100 includes a component, such as a processor 102, to employ execution units 108 including logic to perform algorithms for processing data in accordance with the embodiments described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes, and the like) may also be used. In one embodiment, sample computing system 100 executes a version of the WINDOWS™ operating system available from Microsoft Corporation of Redmond, Wash., although other operating systems (e.g., UNIX and Linux), embedded software, and/or graphical user interfaces may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Examples of handheld devices include, but are not limited to, cellular phones, Internet Protocol devices, digital cameras, personal digital assistants (PDAs), and handheld PCs. Embedded applications may include, but are not limited to, a micro controller, a digital signal processor (DSP), system on a chip (SoC), network computers (NetPC), set-top boxes, network hubs, wide area network (WAN) switches, or any other system that can perform one or more instructions in accordance with at least one embodiment.

In the illustrated embodiment of FIG. 1, processor 102 includes one or more execution units 108 to implement an algorithm that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, an out of order based processor, or any other processor device, such as a digital signal processor, for example. The processor 102 is coupled to a processor bus 110 that transmits data signals between the processor 102 and other components in the system 100, such as main memory 120 storing instruction, data, or any combination thereof. The other components of the system 100 may include, but are not limited to, a graphics accelerator, a memory controller hub, an I/O controller hub, a wireless transceiver, a Flash BIOS, a network controller, an audio controller, a serial expansion port, and an I/O controller. These elements perform their conventional functions that are well known to those familiar with the art.

In one embodiment, the processor 102 includes a Level 1 (L1) internal cache memory 104. Depending on the architecture, the processor 102 may have a single internal cache memory or multiple levels of internal cache memories (e.g., L1 and L2). Other embodiments include a combination of both internal and external caches depending on the particular implementation and needs. Register file 106 is to store different types of data in various registers including, but not limited to, integer registers, floating point registers, vector registers, banked registers, shadow registers, checkpoint registers, status registers, configuration registers, and instruction pointer registers.

Execution unit 108, including logic to perform integer and floating point operations, also resides in the processor 102. It should be noted that the execution unit may or may not have a floating point unit. The processor 102, in one embodiment, includes a microcode (μcode) ROM to store microcode, which when executed, is to perform algorithms for certain macroinstructions or handle complex scenarios. Here, microcode is potentially updateable to handle logic bugs/fixes for processor 102. Alternative embodiments of an execution unit 108 may also be used in micro controllers, embedded processors, graphics devices, DSPs, and other types of logic circuits.

System 100 includes a main memory 120. Main memory 120 may include, but is not limited to, a dynamic random access memory (DRAM) device, a static random access memory (SRAM) device, flash memory device, or other memory device. Main memory 120 stores instructions and/or data represented by data signals that are to be executed by the processor 102. The processor 102 is coupled to the main memory 120 via a processor bus 110. A system logic chip, such as a memory controller hub (MCH) may be coupled to the processor bus 110 and main memory 120. An MCH can provide a high bandwidth memory path to memory 120 for instruction and data storage and for storage of graphics commands, data and textures. The MCH can be used to direct data signals between the processor 102, main memory 120, and other components in the system 100 and to bridge the data signals between processor bus 110, main memory 120, cache memory 104, and system I/O, for example. The MCH may be coupled to main memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the main memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the memory stream module 107 may be used with a system on a chip. The memory for one such system may be a flash memory. The flash memory may be located on the same die as the processor and other system components. Additionally, other logic blocks, such as a memory controller or graphics controller, may also be located on a system on a chip.

One embodiment of a system on a chip includes a processor core, a coherent memory (e.g., memory 120), and one or more non-coherent functional units (e.g., NOCO functional units 130). In some embodiments, the processor core may include a memory stream module 107 to control memory operations for the memory 120 as well as NOCO triggers for the NOCO functional units 130. For example, in some embodiments, the processor core may transmit transactions or operations to the coherent memory 120 and the NOCO functional unit 130. In some embodiments, the processor core may transmit a memory operation (e.g., a read or write transaction) to the coherent memory. The memory operation may be to store instructions and commands in the memory. Such instructions and commands may be referred to as a control block (CB). In some embodiments, the CB may be stored in a predefined and specific region of the coherent memory 120. The processor core may further transmit a NOCO trigger operation to one of the NOCO functional units 130. For example, the NOCO trigger operation may be transmitted via a memory-mapped input/output (TO) write transaction issued by the processor core of the processor 102. Upon receiving the NOCO trigger from the processor core, the NOCO functional unit may retrieve the CB from the coherent memory 120 and the NOCO functional unit 130 may perform operations based on the retrieved CB. For example, the NOCO functional unit 130 may retrieve data corresponding to the CB and perform operations on the data based on instructions and a location of the data that may be identified in the CB. Subsequently, the NOCO functional unit 130 may process the data based on the CB and may write the processed data to the coherent memory 120. For example, the NOCO functional unit 130 may initiate a write transaction to the coherent memory 120 to store the processed data in another location of the coherent memory 120. Furthermore, the NOCO functional unit 130 may tag or mark the CB as being completed after the data has been processed based on the CB.

In some embodiments, the NOCO functional unit may be, but is not limited to, a graphics controller, processor, or processing device, a network controller, processor, or processing device, a direct memory access (DMA) controller, processor, or processing device, or any other device used in a programmed input/output (PIO) associated with a processing device. For example, the NOCO functional unit 130 may be an IO device that includes an arithmetic logic unit (ALU) or other processing capabilities.

Figure 2:
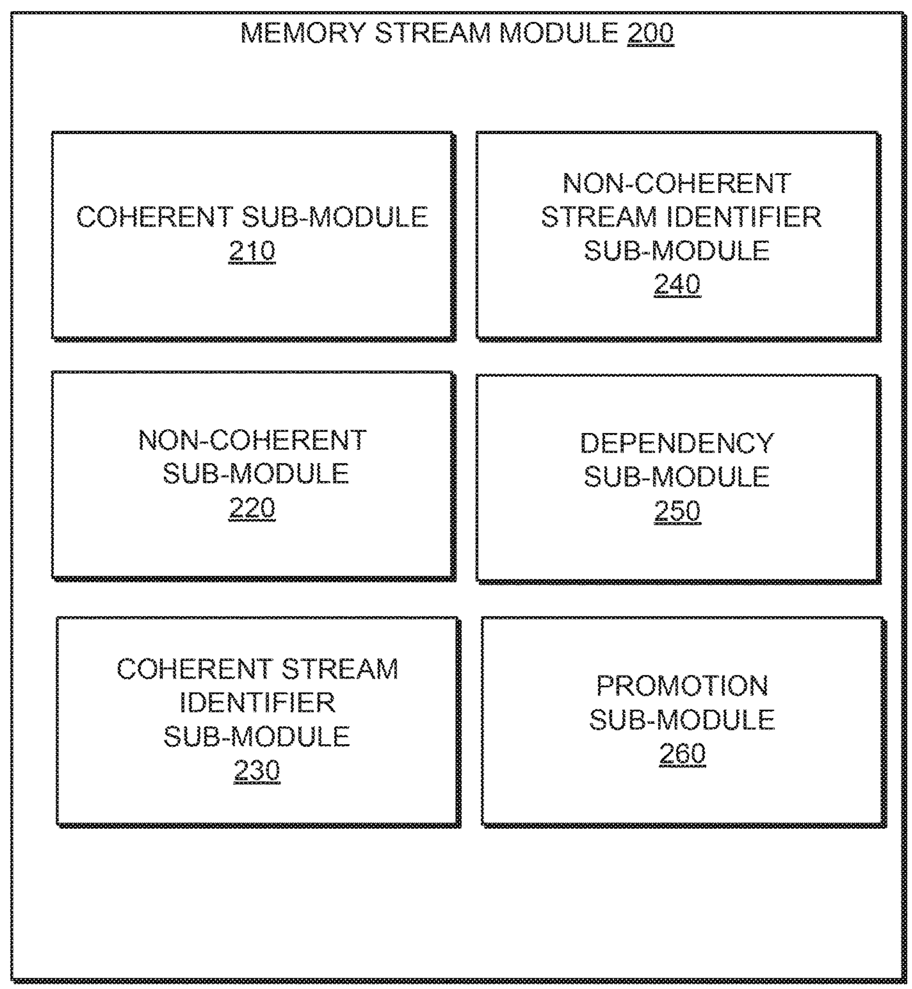
FIG. 2 is a block diagram illustrating a memory stream module in accordance with some embodiments of the disclosure.

FIG. 2 is a block diagram illustrating an example memory stream module 200 in accordance with some embodiments of the disclosure. The memory stream module 200 may correspond to the memory stream module 107 of FIG. 1. In general, the memory stream module 200 may include a coherent sub-module (or function block) 210, a non-coherent sub-module (or function block) 220, a non-coherent stream identifier sub-module (or function block) 230, a coherent stream identifier sub-module (or function block) 240, a dependency sub-module (or function block) 250, and a promotion sub-module (or function block) 260. In alternative embodiments, the functionality of one or more of the sub-modules may be combined or divided. For example, a single sub-module may perform the functionality of the coherent sub-module 210, non-coherent sub-module 220, non-coherent stream identifier sub-module 230, coherent stream identifier sub-module 240, a dependency sub-module 250, and the promotion sub-module 260. Alternatively, the functionality of each of the sub-modules 210, 220, 230, 240, 250, and 260 may be separated between multiple sub-modules.

As shown in FIG. 2, memory stream module 200 may include a coherent sub-module 210. In some embodiments, the coherent sub-module 210 may receive or identify one or more memory operations associated with a memory (e.g., coherent memory 120). For example, the coherent sub-module 210 may identify memory operations associated with a coherent memory. The memory operations may include a write operation to write data (e.g., a control block) to a coherent memory or a read operation to read data from the coherent memory. The memory stream module 200 may include a non-coherent sub-module 220. In some embodiments, the non-coherent sub-module 220 may receive or identify one or more NOCO trigger operations associated with a NOCO functional unit. For example, the non-coherent sub-module 220 may identify NOCO triggers associated with one or more NOCO functional units to retrieve data (e.g., a control block) stored in the coherent memory. The memory stream module 230 may further include a coherent stream identifier sub-module 230. In some embodiments, the coherent stream identifier sub-module 230 may define a stream of memory operations associated with the coherent memory. A stream of memory operations may refer to a series of memory operations that have been issued. For example, the coherent stream identifier sub-module 230 may define an order of the memory operations to be performed or executed. In some embodiments, the order of the memory operations may be defined so that the memory operations are in program order (e.g., in order of when the memory operation is issued) or the order of the memory operations may be defined by relaxing the order of the memory operations when a read operation of the memory operations follows a write operation of the memory operations. For example, a read transaction or operation (also referred to as a load) may be performed before a write operation or transaction (also referred to as a store) that is earlier in the program order than the read transaction or operation. Such an order may be referred to as Total Store Order (TSO). Further details with regard to the ordering or sequencing of memory operations are disclosed in further detail with regard to FIGS. 4A-4C. The memory stream module 200 may further include a non-coherent stream identifier sub-module 240. In some embodiments, the non-coherent stream identifier sub-module 240 may define the order of NOCO trigger operations. For example, in some embodiments, the trigger operations may be in sequential order. In some embodiments, sequential order may refer to program order where operations (e.g., NOCO trigger operations) are performed so that earlier issued NOCO triggers in program order are performed before a later issued NOCO trigger in the program order.

Thus, a series of memory operations may be received. The series of memory operations may be in program order (e.g., in order when the memory operations are issued). The series of memory operations may be ordered based on sequential ordering or based on an ordering where a read transaction followed by a write transaction may be performed before the write transaction. Furthermore, a series of NOCO triggers may be received. The NOCO triggers may be based on sequential ordering.

Referring to FIG. 2, the memory stream module 200 may include a dependency sub-module 250. In some embodiments, the dependency sub-module 250 may define a dependency for one or more NOCO triggers based on a memory operation. In some embodiments, a dependency may refer to a requirement that a particular memory operation be executed or completed before a NOCO trigger that is dependent upon the particular memory operation may be executed. In some embodiments, a dependency may be defined for a trigger operation based on a read transaction or memory operation (e.g., a NOCO trigger may not be executed and bypass an older read operation) and/or the dependency may be defined for a NOCO trigger based on a promoted write memory operation. For example, the memory stream module 200 may include a promotion sub-module 260. In some embodiments, the promotion sub-module 260 may identify that a write memory operation has been promoted. A promoted write operation may refer to a write operation that is dispatched outside of a processor or processing device. In response to the identification of the write memory operation being promoted, the promotion sub-module 260 may create a dependency for a NOCO trigger based on the write memory operation that has been promoted.

Figure 3:
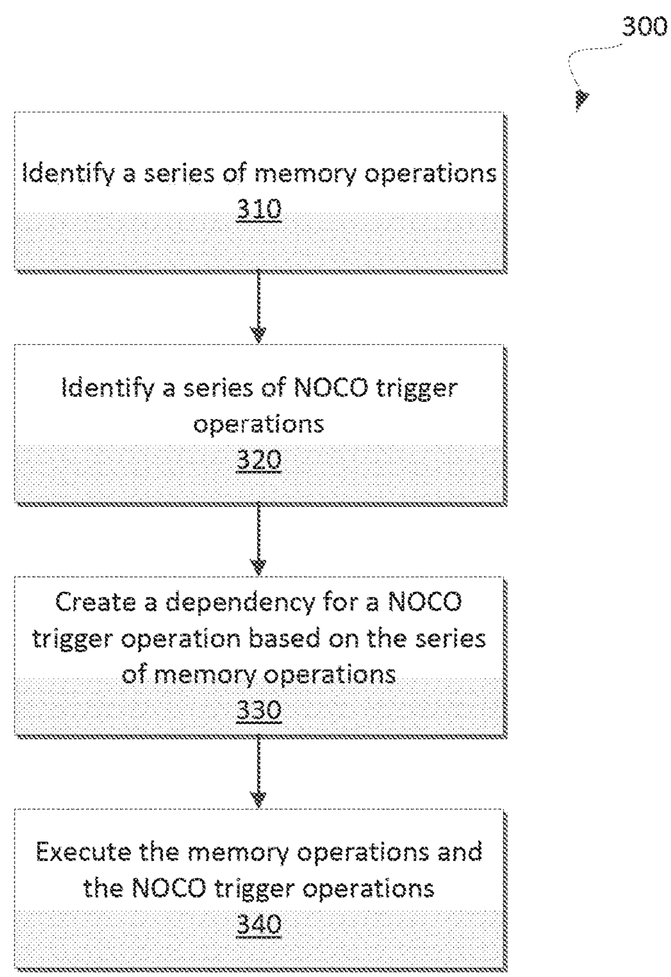
FIG. 3 is a flow diagram of a method to execute memory operations and non-coherent (NOCO) triggers in accordance with some embodiments.

FIG. 3 is a flow diagram of a method 300 to execute memory operations and non-coherent functional unit (NOCO) triggers in accordance with some embodiments. In some embodiments, the method 300 may be performed by the memory stream module 107 or 200. For example, the method 300 may be used by the memory stream module 107 of FIG. 1 or the memory stream module 200 of FIG. 2 to control and/or update an execution order and dependencies associated with memory operations corresponding to a coherent memory and NOCO triggers corresponding to NOCO functional units of a processor (e.g., processor 102). The method 300 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 300.

As shown in FIG. 3, the method 300 may begin with the processing logic identifying, at block 310, a series of memory operations (block 310). In some embodiments, the memory operations may be in a sequential order (e.g., in program order) or may be in Total Store Order where a write transaction that is followed by a read memory operation may be relaxed or modified so that the read memory operation may be executed before an earlier write memory operation. Furthermore, the memory operations may be associated with read memory operations and write memory operations to a coherent memory that may be used to store control blocks and processed data. For example, the memory operations may specify instructions for a NOCO functional unit. In some embodiments, the instructions may include information to control how the NOCO functional unit may execute, the commands that the NOCO functional unit should execute, the location of data that the NOCO functional unit should retrieve to execute upon, and so forth. Thus, the control block may include information that determines the data that a NOCO functional unit should retrieve, how to operate on the data that the NOCO functional unit is to retrieve to generate processed data, and a location in the coherent memory to store the processed data.

The processing logic may further identify a series of NOCO triggers (block 320). In some embodiments, the NOCO triggers may be an instruction or command for a corresponding NOCO functional unit to retrieve data from a coherent memory. For example, a NOCO trigger may specify a location of a control block stored in the coherent memory that the NOCO functional unit is to retrieve and/or to execute. Thus, the NOCO trigger may be considered an operation to specify how a NOCO functional unit is to operate.

Referring to FIG. 3, the processing logic may create a dependency for a NOCO trigger based on the series of memory operations (block 330). In some embodiments, the dependency may specify that a particular NOCO trigger is not to be executed before a particular memory operation of the series of memory operation has been executed. Thus, the dependency may be considered a type of restriction for when a particular NOCO trigger may be executed. Furthermore, the processing logic may execute the memory operations and the NOCO triggers (block 340). For example, the processing logic may execute the memory operations and the NOCO triggers so that one or more of the NOCO triggers are dependent upon one or more of the memory operations.

Figure 4A:
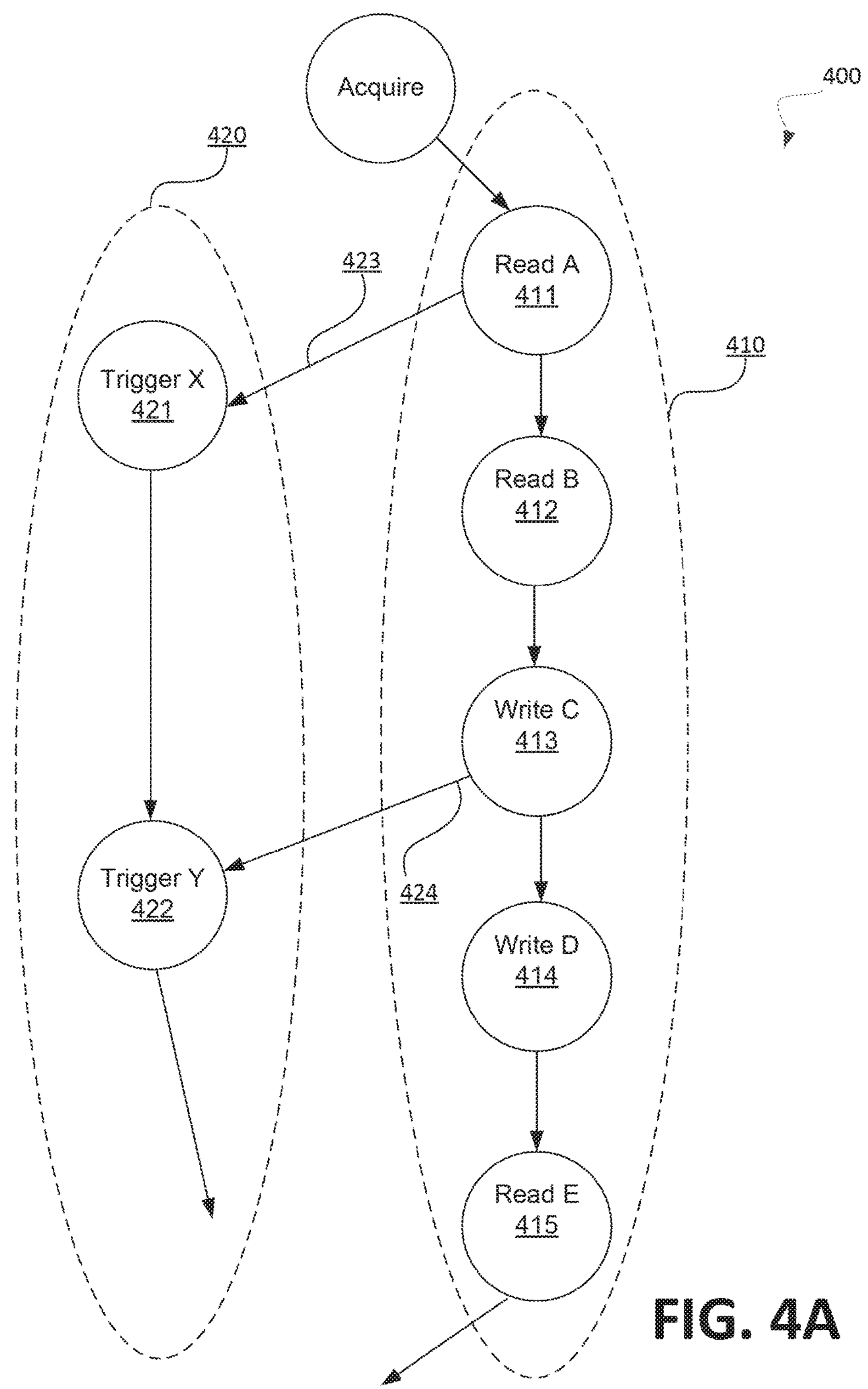
FIG. 4A illustrates an example sequence of memory operations and NOCO triggers in accordance with some embodiments.

FIG. 4A illustrates an example sequence 400 of memory operations and NOCO triggers in accordance with some embodiments. In general, the sequence 400 may include a first stream of memory operations corresponding to a coherent memory (e.g., memory 120) and a second stream of NOCO triggers corresponding to at least one NOCO functional unit (e.g., NOCO 130) where a NOCO trigger of the second stream may not be executed before an earlier read operation of the memory operations of the first stream. The sequence 400 may be created by the memory stream module 107 of FIG. 1 or the memory stream module 200 of FIG. 2. For example, the memory stream module may define a dependency for a NOCO trigger so that the NOCO trigger cannot be executed before an earlier memory operation that is a read transaction from the first stream.

As shown in FIG. 4A, the sequence 400 may include a first stream 410 of memory operations for a coherent memory that includes memory operation 411 referred to as read memory operation A, memory operation 412 referred to as read memory operation B, memory operation 413 referred to as write memory operation C, memory operation 414 referred to as write memory operation D, and memory operation 415 referred to as read memory operation E. Furthermore, the sequence 400 may include a second stream 420 of NOCO triggers for one or more NOCO functional units that includes NOCO trigger 421 referred to as trigger X and NOCO trigger 422 that may be referred to as trigger Y. In some embodiments, each of the NOCO triggers may be a write operation to a NOCO functional unit. Thus, the sequence 400 may include a first stream of read and write operations to a coherent memory and a second stream of write operations to a NOCO functional unit. The placement of each of the memory operations and NOCO triggers may correspond to a time when the memory operation or NOCO trigger has been issued. For example, the closer to the Acquire operation that a memory operation or NOCO trigger is then the earlier that the memory operation or trigger operation has been issued in program order. For example, read memory operation A may be considered the first operation in program order, trigger X may be considered the second operation in program order, read and write memory operations B and C may be considered the third and fourth operations in program order, trigger Y may be considered the fifth operation in program order, and so forth.

In some embodiments, the sequence 400 may be referred to as a relaxed sequential consistency with a NOCO stream. For example, sequential consistency may refer to executing memory operations and NOCO triggers in program order (e.g., in the order that the operations are issued). Such a sequential consistency may result in the executing of the read memory operation A followed by the trigger X which is then followed by read memory operation B and write operation C with trigger Y following read memory operation B and write memory operation C. However, relaxed sequential consistency with a NOCO stream may define a dependency between a NOCO trigger and one of the memory operations if the memory operation is a read memory operation that was issued before the NOCO trigger was issued. In some embodiments, the memory operations of the stream 410 may be executed without waiting for a particular NOCO trigger to be executed. For example, any of the memory operations B, C, D, and E may be allowed to execute before any of the NOCO triggers X and Y have been executed. However, the memory operations B, C, D, and E may be executed in program order (e.g., memory operation B must be executed before later memory operations C, D, or E). Thus, the stream 410 of memory operations may be considered independent of the NOCO triggers. The stream 420 of NOCO trigger operations may be placed in sequential order with other NOCO triggers. For example, the NOCO trigger X may be issued earlier in program order than NOCO trigger Y. Thus, the NOCO trigger X must be executed before the NOCO trigger Y may be executed. However, dependencies 423 and 424 may be defined between the NOCO trigger X and the NOCO trigger Y with memory operations 411 and 413. For example, the NOCO trigger X may not be allowed to execute until the memory operation A has been executed and the NOCO trigger Y may not be allowed to execute until the NOCO trigger X and the memory operation C have been executed. Thus, the dependencies 423 and 424 define when a NOCO trigger may be executed based on a memory operation. Thus, a particular NOCO trigger (e.g., NOCO trigger Y) may not be allowed to execute until a prior NOCO trigger (e.g. NOCO trigger X) and a particular memory operation (e.g. memory operation C) have been executed.

Figure 4B:
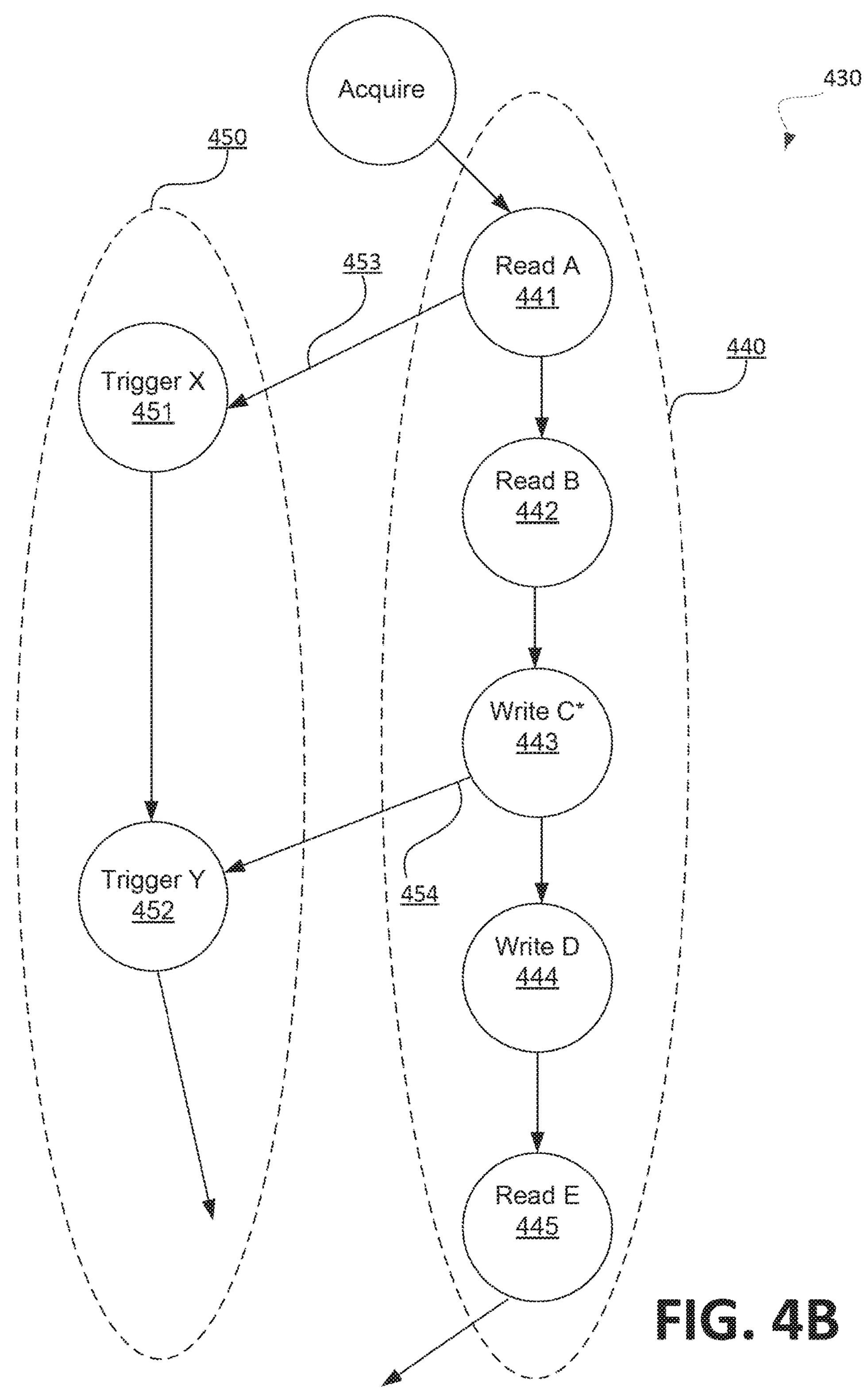
FIG. 4B illustrates another example sequence of memory operations and NOCO triggers in accordance with some embodiments.

FIG. 4B illustrates another example sequence 430 of memory operations and triggers in accordance with some embodiments. In general, the sequence 400 may include a first stream of memory operations corresponding to a coherent memory (e.g., memory 120) and a second stream of NOCO triggers corresponding to at least one NOCO functional unit (e.g., NOCO 130) where a NOCO trigger of the second stream may not be executed before a promoted write operation of the memory operations of the first stream has been executed. The sequence 430 may be created by the memory stream module 107 of FIG. 1 or the memory stream module 200 of FIG. 2. For example, the memory stream module may define a dependency for a NOCO trigger so that the NOCO trigger cannot be executed before an earlier memory operation that is a promoted write operation from the first stream.

As shown in FIG. 4B, the first stream 440 may include memory operations 441, 442, 443, 444, and 445. Furthermore, the second stream 450 may include NOCO trigger operation 451 and NOCO trigger operation 452. The sequence 430 may be referred to as a weakly NOCO stream with a one way fence. For example, the memory operation C* may be referred to as a promoted write operation. In some embodiments, a promoted write operation may be a write operation that may be dispatched or executed outside of a CPU. For example, the promoted write operation corresponding to the memory operation C* may be to write a new control block to a coherent memory that is to be operated upon by a NOCO functional unit. In some embodiments, the promoted write transaction may result in a new dependency 454 that specifies that the NOCO trigger operation Y may not be executed until after the promoted write transaction has been executed. A dependency 453 may also define that the NOCO trigger operation X may not be executed before the read memory operation A.

Figure 4C:
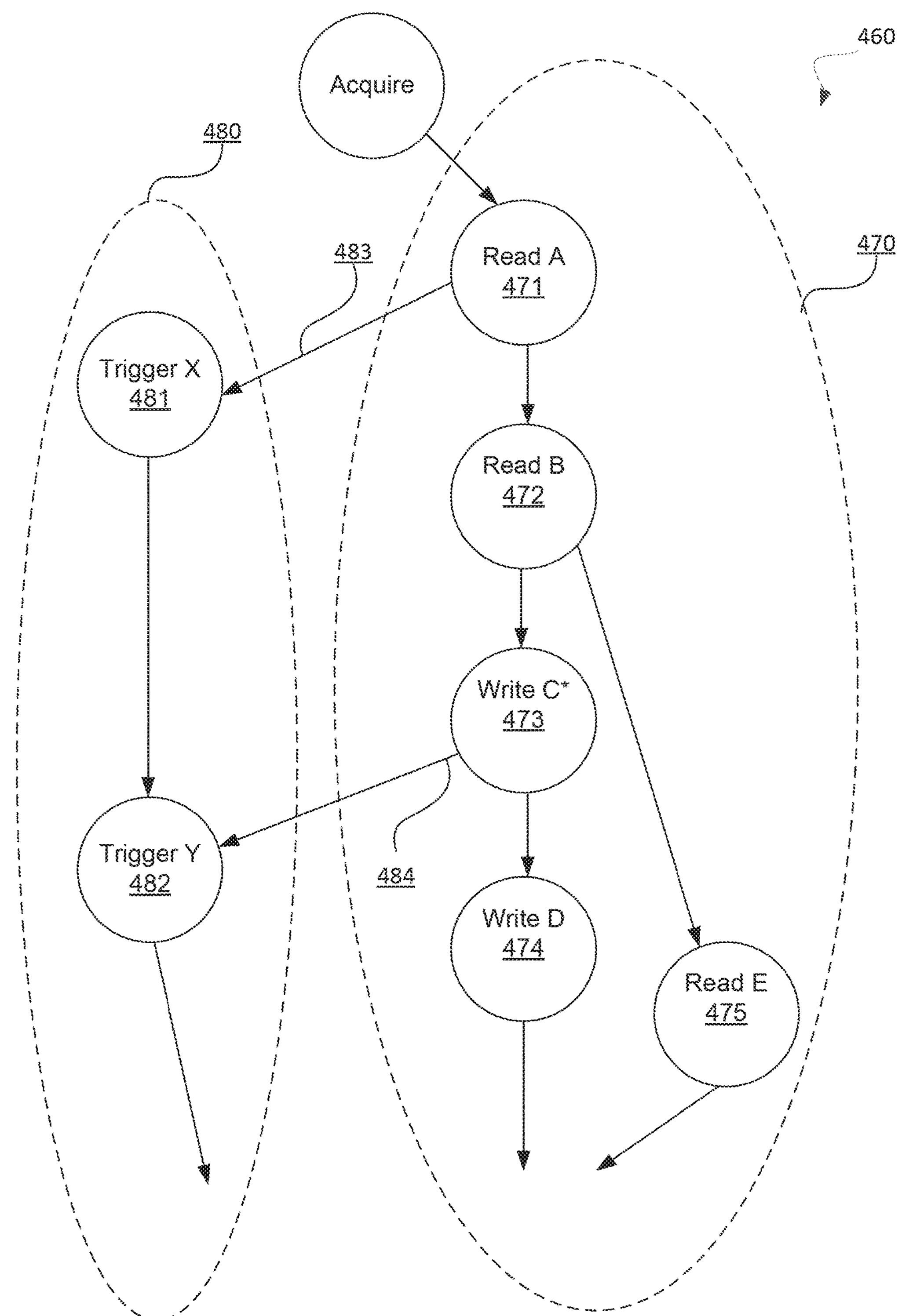
FIG. 4C illustrates another example sequence of memory operations and NOCO triggers in accordance with some embodiments.

FIG. 4C illustrates another example sequence 460 of memory operations and triggers in accordance with some embodiments. In general, the sequence 460 may include a first stream of memory operations corresponding to a coherent memory (e.g., memory 120) and a second stream of NOCO triggers corresponding to at least one NOCO functional unit (e.g., NOCO 130) where a NOCO trigger of the second stream may not be executed before a promoted write operation of the memory operations of the first stream has been executed and memory operations of the first stream may be ordered so that a later read memory operation may be executed before an earlier write memory operation. The sequence 460 may be created by the memory stream module 107 of FIG. 1 or the memory stream module 200 of FIG. 2. For example, the memory stream module may define a dependency for a NOCO trigger so that the NOCO trigger cannot be executed before an earlier memory operation that is a promoted write memory operation from the first stream.

As shown in FIG. 4C, the first stream 470 may include memory operations 471, 472, 473, 474, and 475. Furthermore, the second stream 480 may include NOCO trigger 481 and NOCO trigger 482. The sequence 460 may be referred to as a relaxed Total Store Order (TSO) with a non-coherent (NOCO) stream. For example, the memory operations of the first stream 470 may be ordered based on TSO so that a read transaction (e.g., memory operation E) may be executed before earlier write transactions (e.g., memory operations C* and D) of the memory operations. Similar to the sequence 430, the dependencies 483 and 484 may define when corresponding trigger operations may be performed or executed.

Thus, the sequence 460 may specify a first stream corresponding to memory operations and a second stream corresponding to NOCO triggers. In some embodiments, the NOCO triggers of the second stream may be executed in sequential order relative to other NOCO triggers. For example, a first NOCO trigger issued at a first time may be executed before a second NOCO trigger issued at a second time later than the first time and the second NOCO trigger may not be allowed to execute until the first NOCO trigger has been executed. Furthermore, memory operations may be ordered so that a read memory operation issued at a later time than a first write memory operation has been issued may be executed before the first write memory operation has been executed.

As such, the sequence 460 may specify a stream of memory operations where certain later memory operations may be performed before other memory operations while also specifying a second stream of NOCO triggers in sequential order relative to other NOCO triggers but where one or more of the NOCO triggers are dependent upon at least one of the memory operations of the first stream. Thus, a later memory operation may be executed or dispatched before an earlier NOCO trigger and some of the other earlier memory operations, but a later NOCO trigger may not be executed or dispatched before an earlier NOCO trigger and may further be dependent upon at least one memory operation.

Figure 5:
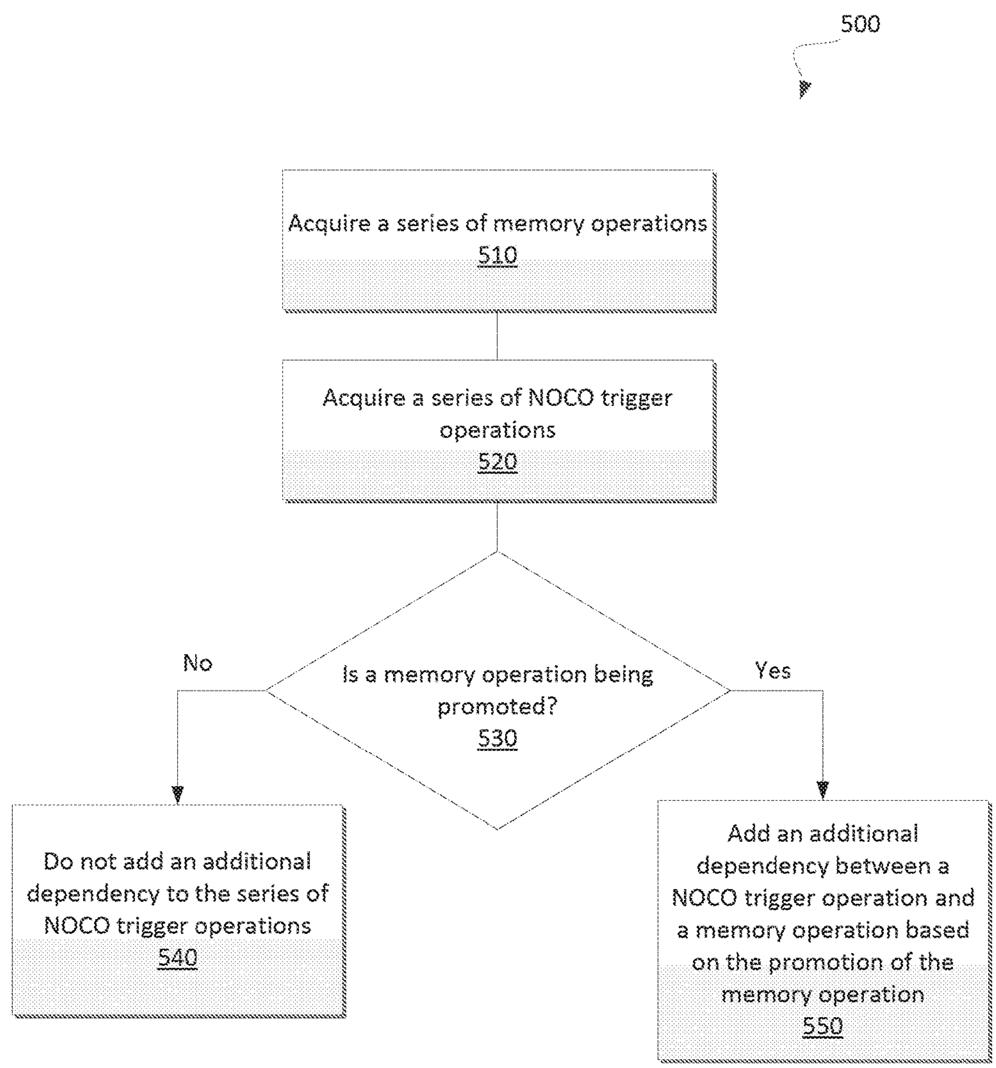
FIG. 5 illustrates a method to add a dependency to a sequence of memory operations and NOCO triggers based on a promotion of a memory operation in accordance with some embodiments of the disclosure.

FIG. 5 illustrates a method 500 to add a dependency to a sequence of memory operations and NOCO triggers based on a promotion of a memory operation in accordance with some embodiments of the disclosure. In some embodiments, the method 500 may be performed by the memory stream module 107 or 200. For example, the method 500 may be used by the memory stream module 107 of FIG. 1 or the memory stream module 200 of FIG. 2 to control and/or update an execution order and dependencies associated with memory operations corresponding to a coherent memory and NOCO triggers corresponding to NOCO functional units of a processor (e.g., processor 102). The method 500 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 300.

As shown in FIG. 5, the method 500 may begin with the processing logic acquiring, at block 510, a series of memory operations (block 510) and a series of NOCO trigger operations (block 520). For example, the processing logic may acquire a stream including multiple memory operations and multiple NOCO trigger operations. The processing logic may further determine if a memory operation is being promoted (bock 530). For example, if a particular memory operation that is included in the acquired stream is subject to a Global Observe that may result in write transaction to the coherent memory that is dispatched outside of the CPU. Thus, if the processing logic identifies that a memory operation has been promoted then a dependency may be added between a NOCO trigger operation and a memory operation based on the promotion of the memory operation (block 550). For example, a particular NOCO trigger may not be allowed to execute until a memory operation that has been promoted has been executed and completed (e.g., a data block has been written into a coherent memory). However, if the processing logic does not identify that a memory operation has been promoted then no additional dependency may be added to the series of NOCO trigger operations (block 540).

Figure 6:
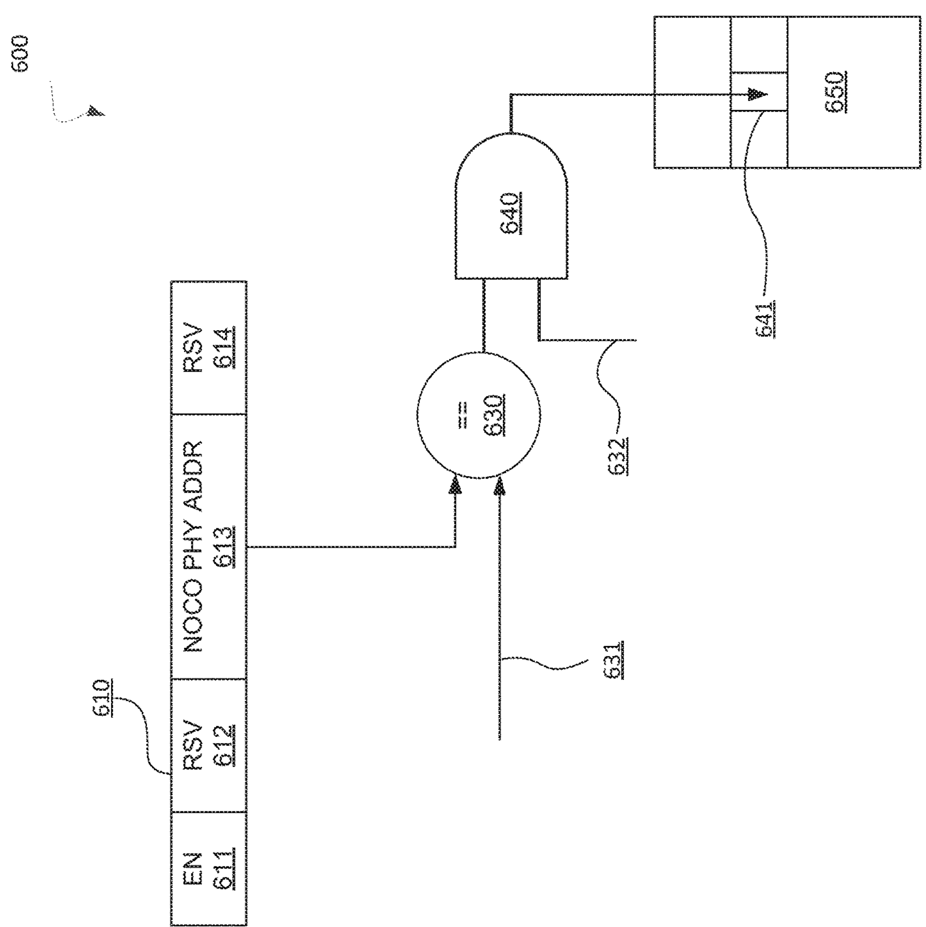
FIG. 6 illustrates an example architecture to detect a NOCO trigger in accordance with some embodiments of the disclosure.

FIG. 6 illustrates an example architecture 600 to detect a NOCO trigger operation in accordance with some embodiments of the disclosure. In general, the architecture 600 may be part of a memory stream module (e.g., memory stream module 107 or memory stream module 200) and/or be implemented in hardware of a processor or processing device (e.g., processor 100). The architecture 600 may be used to identify a NOCO trigger operation in a memory stream. In some embodiments, the NOCO trigger operation may be considered a type of write transaction (i.e., a memory mapped IO write).

As shown in FIG. 6, the architecture 600 may include a non-coherent memory specific register (NOCO MSR) 610, a comparator 630, a logic gate 640, and a translation lookaside buffer (TLB) 650. In some embodiments, the NOCO MSR 610 may specify a memory address range that is associated with a NOCO portion of a processing device architecture. For example, the NOCO MSR may include data fields 611, 612, 613, and 614. In some embodiments, one of the data fields of the NOCO MSR 610 may correspond to a physical address range that is associated with the NOCO portion of the processing device. For example, the data field 613 may be a non-coherent physical address (NOCO PHY ADDR) that specifies an address range used by a NOCO portion of a processing device architecture. In some embodiments, an input signal 631 may correspond to a page miss handler (PMH). For example, a processing device may walk through page tables to see if a valid page table entry exists for a specified virtual address. If an entry exists, the address of the entry is compared with addresses in the NOCO PHY ADDR data field 613 of the NOCO MSR 610. For example, the comparator 630 may compare the address from the NOCO MSR 610 with the address from the PMH return PHY ADDR input signal 631. If the comparator 630 outputs a '1' to indicate that the address from the input signal 631 matches one of the addresses of the data field 631 an enable signal 632 is set to one then the logic gate 640 (e.g., an AND gate) may output a bit to be stored in the TLB. For example, a dedicated storage field in the TLB may be used to store the non-coherent bit. Thus, when the TLB entries are read, the non-coherent bit may indicate that an operation associated with the TLB entry is associated with a non-coherent portion of the processing device architecture.

Figure 7:
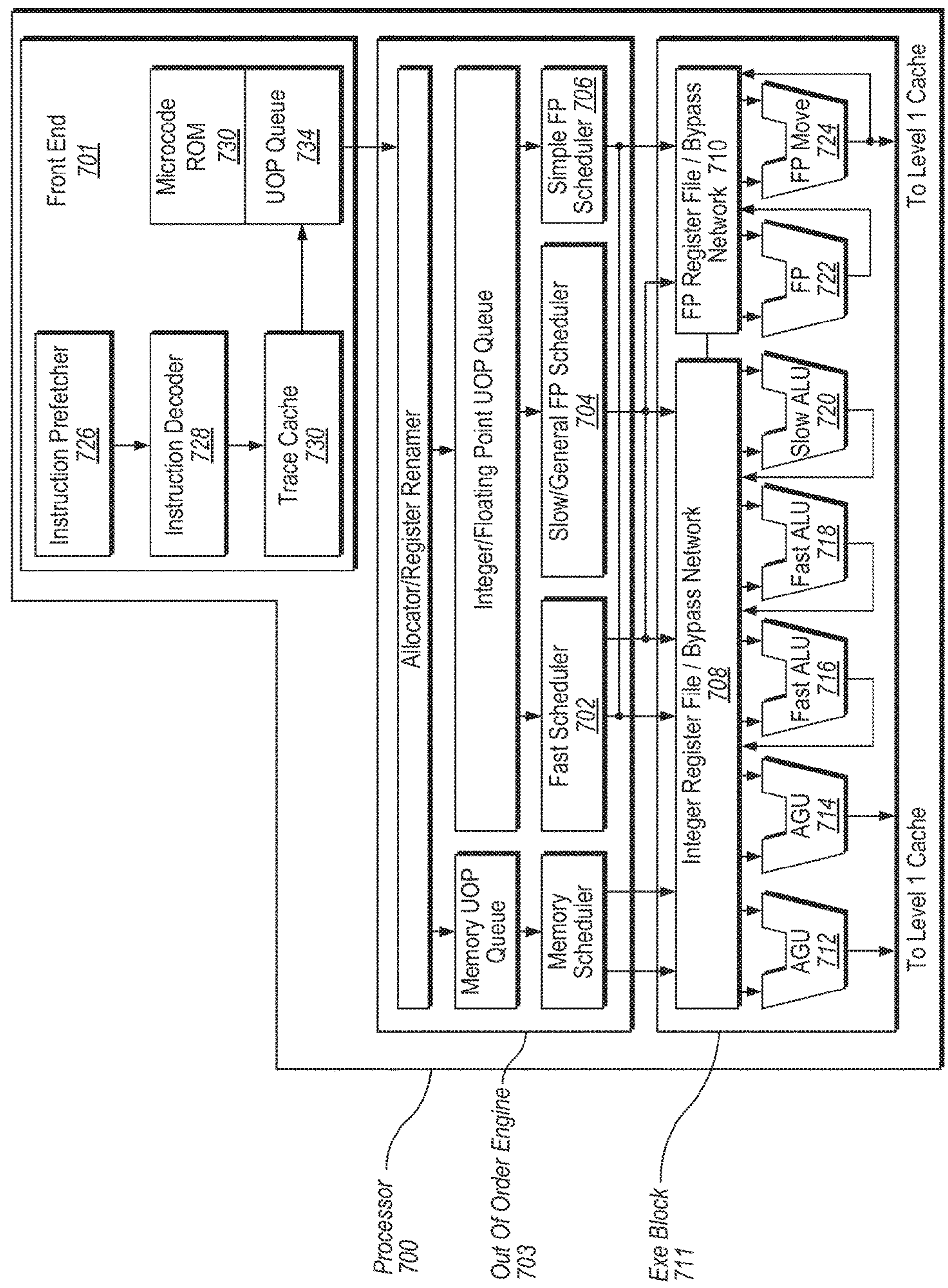
FIG. 7 illustrates a block diagram of the micro-architecture for a processor that includes logic circuits to manage checkpoints associated with an out of order instruction pipeline according to one embodiment.

FIG. 7 illustrates a block diagram of the micro-architecture for a processor 700 that includes logic circuits to manage memory sequences according to one embodiment. The memory stream module 107 and 200 may be implemented in the processor 700. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution. In some embodiments, the out-of-order execution engine 703 and the exe block 711 may notify a retirement unit with regard to the allocation and completion/execution of an instruction.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to manage checkpoints of an out of order architecture according to one embodiment. In one embodiment, the execution block 711 of processor 700 may include the checkpoint module 200, to manage checkpoints of an out of order architecture according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
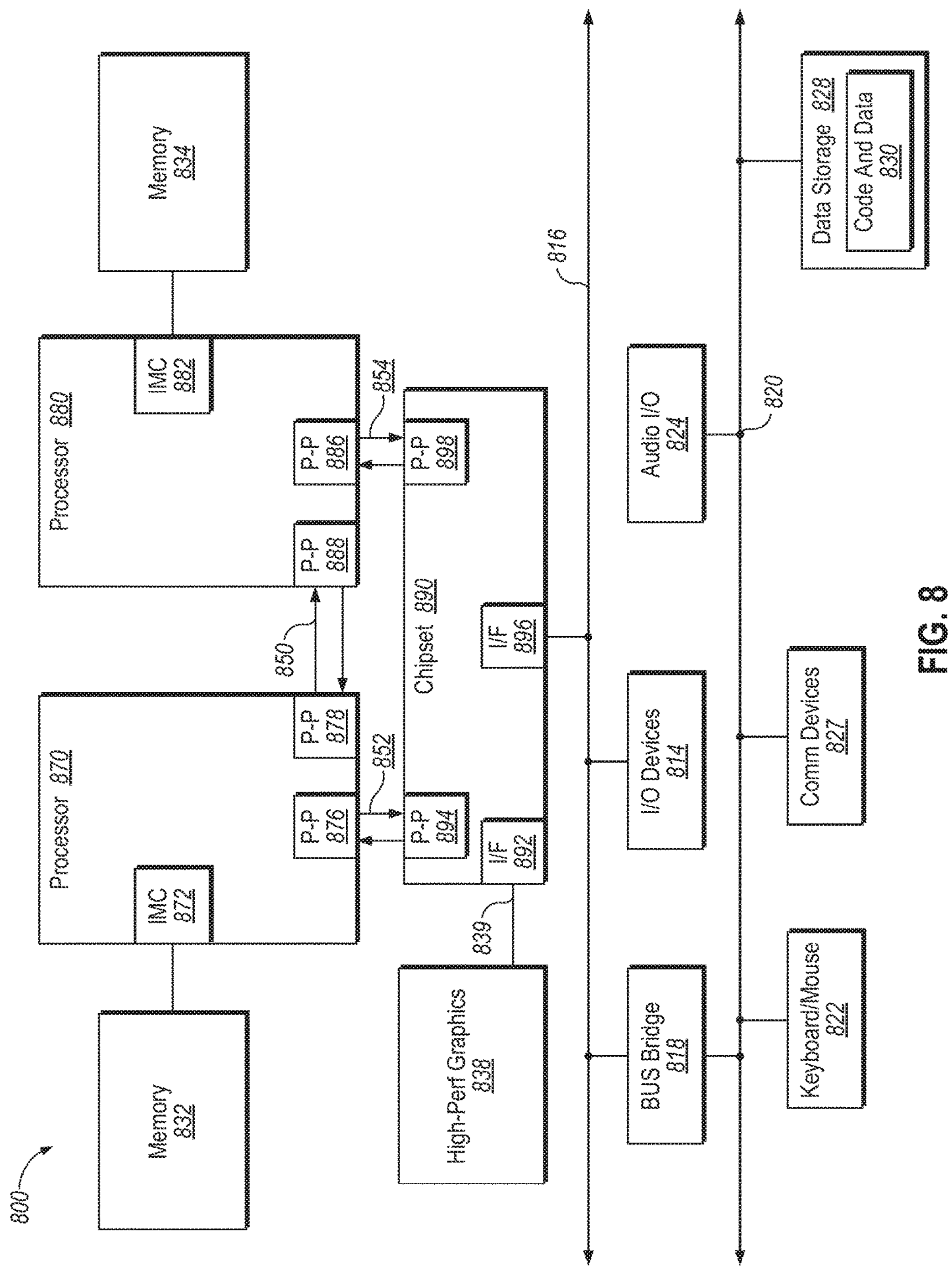
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores, although potentially many more cores may be present in the processors. The processors each may include hybrid write mode logics in accordance with an embodiment of the present. In some embodiments, the memory stream modules 107 and 200 may be implemented in the multiprocessor system 800. For example, the memory stream modules 107 and 200 may be implemented in the processor 870 and/or the processor 880.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
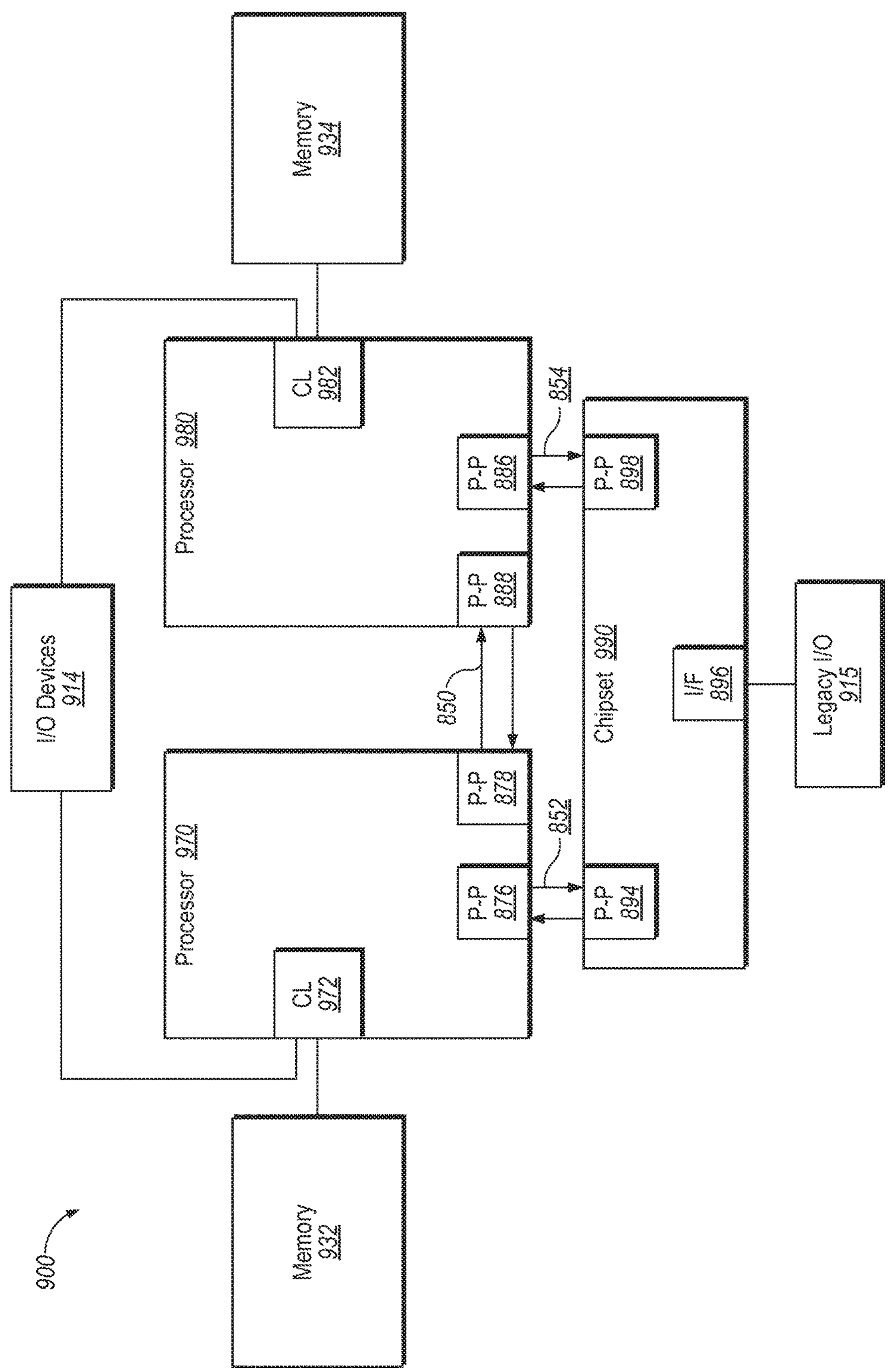
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 915 are also coupled to the control logic 972, 982. Legacy I/O devices 915 are coupled to the chipset 990. In some embodiments, the memory stream modules 107 and 200 may be implemented in the system 900. For example, the memory stream modules 107 and 200 may be implemented in the processor 970 and/or the processor 980.

Figure 10:
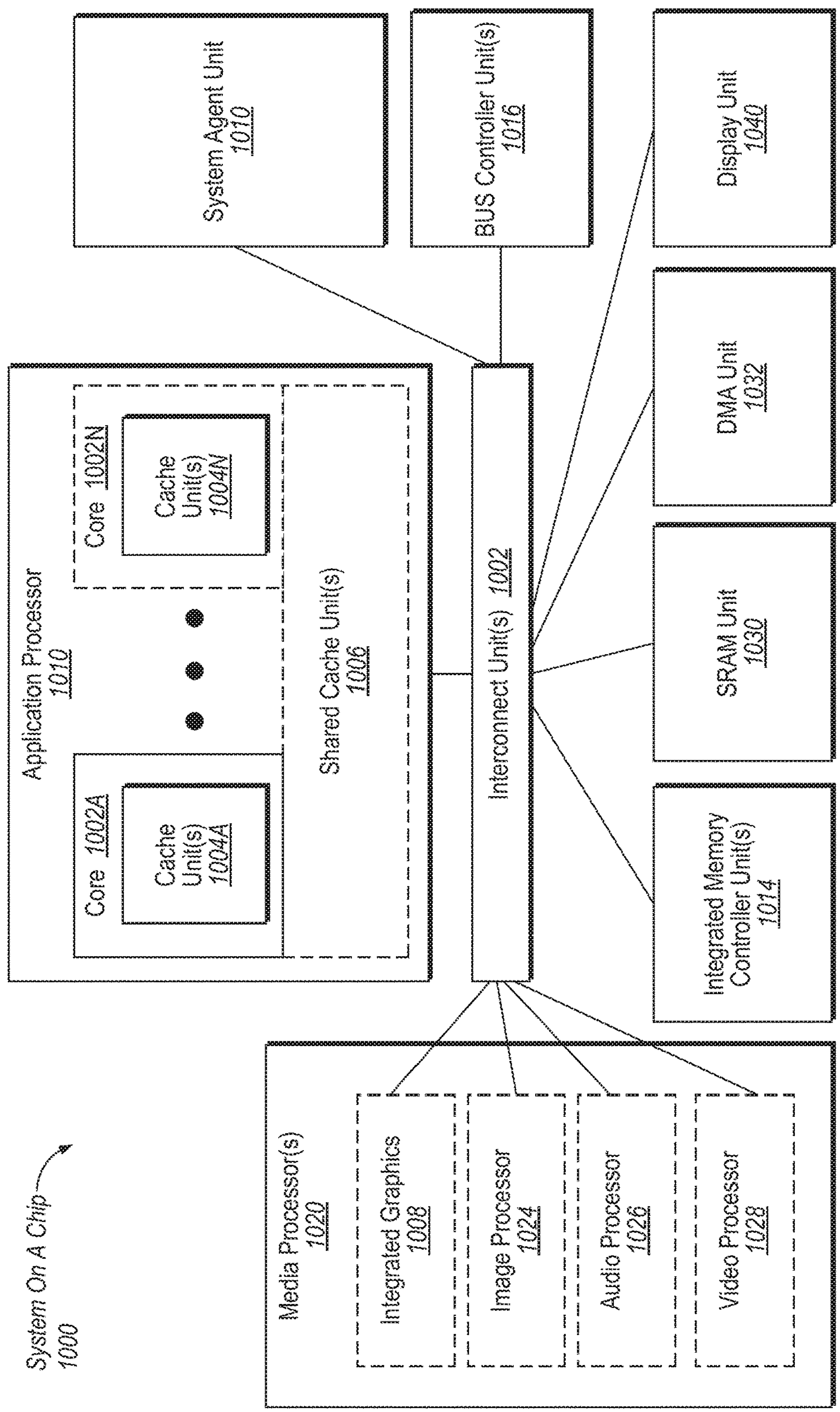
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 5 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. In some embodiments, the memory stream modules 107 and 200 may be implemented in the SoC 1000. For example, the memory stream modules 107 and 200 may be implemented in the application processor 1010 and/or cores 1002A-N.

Figure 11:
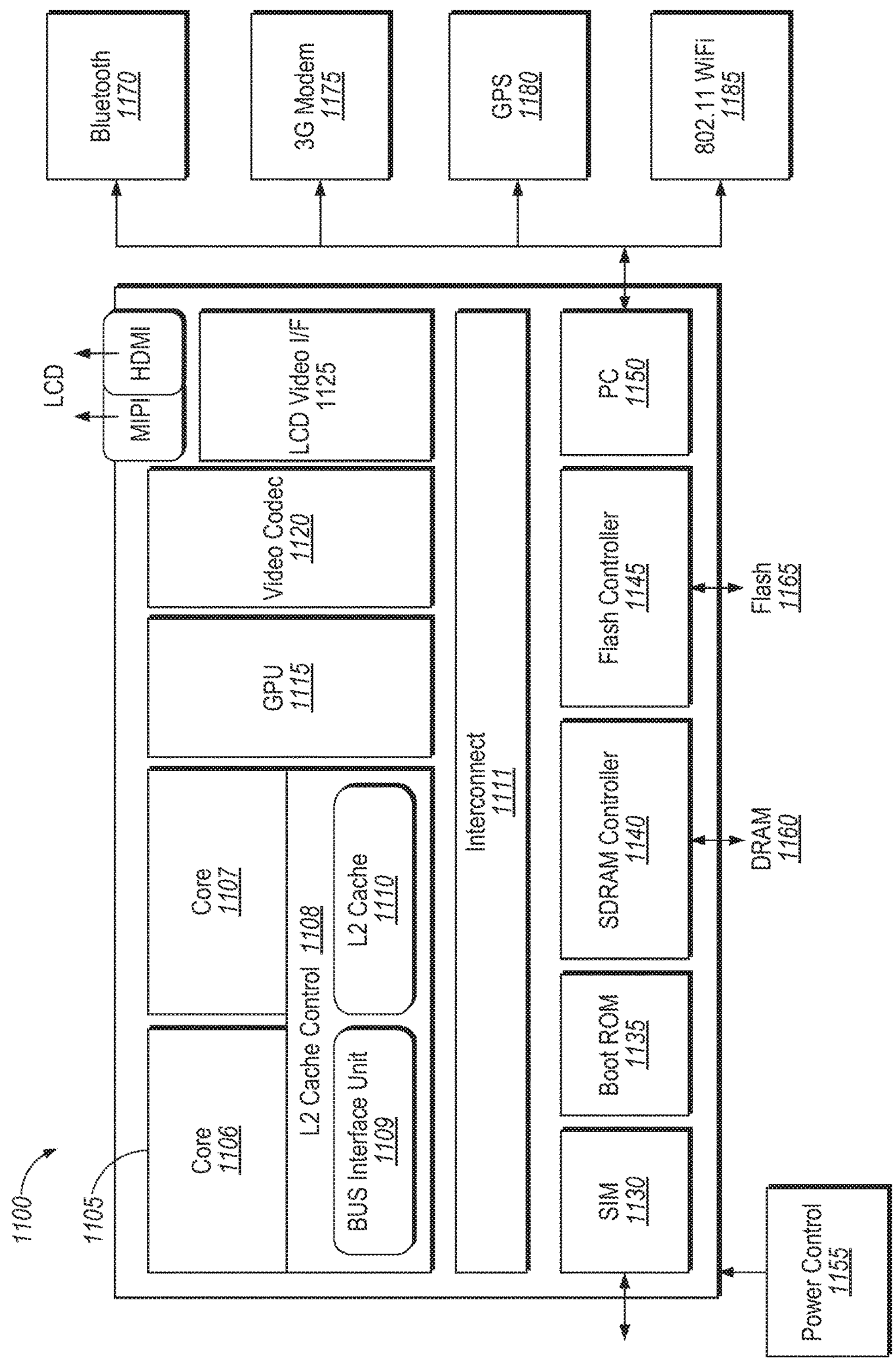
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. In some embodiments, the memory stream modules 107 and 200 may be implemented in the SCC 1100. For example, the memory stream modules 107 and 200 may be implemented in the core 1106 and/or core 1107.

Here, SOC 1100 includes two cores-1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
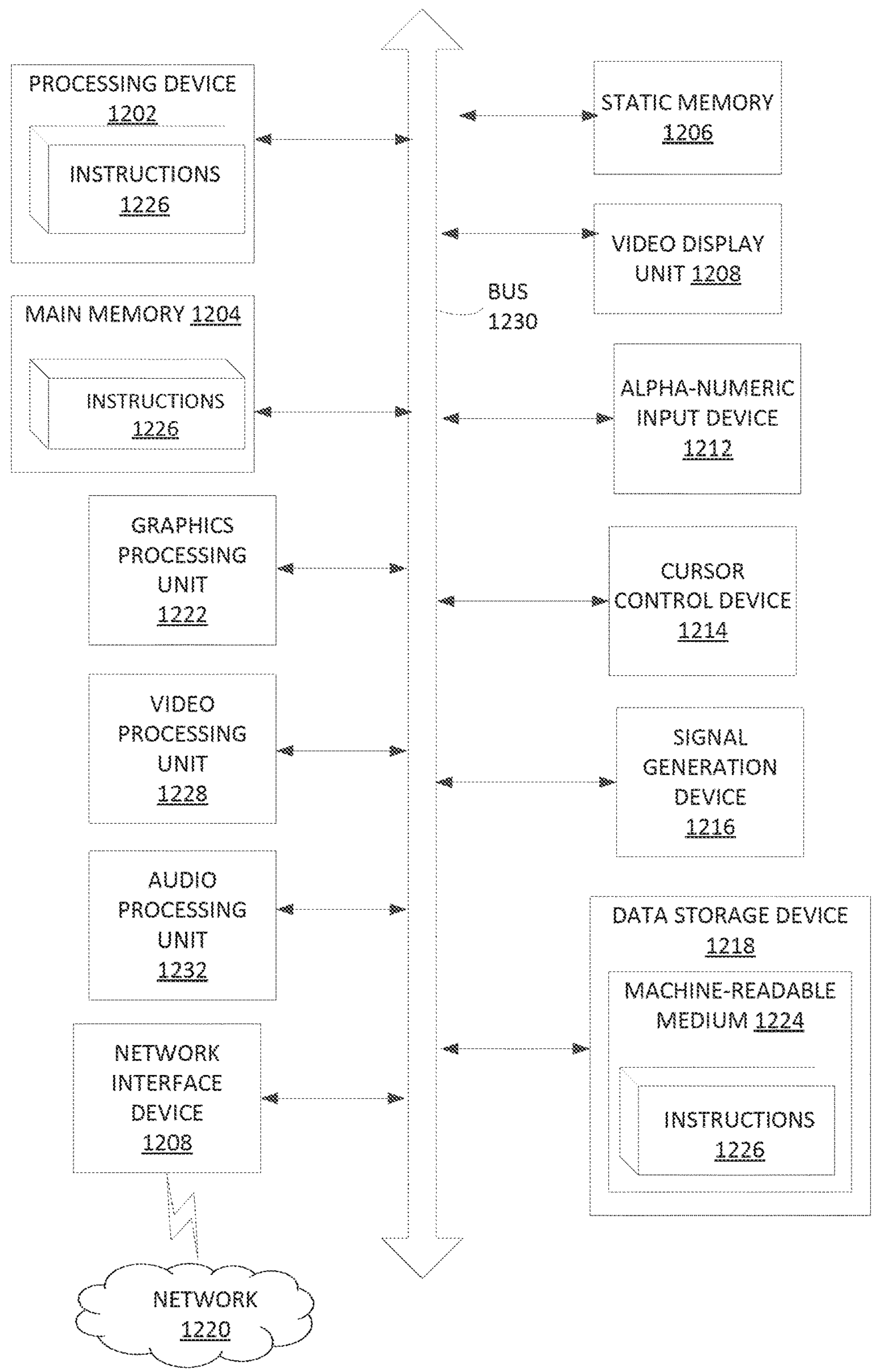
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230. In some embodiments, the memory stream modules 107 and 200 may be implemented in the system 1200. For example, the memory stream modules 107 and 200 may be implemented in the processing device 1202 and/or be stored in the instructions 1226.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising a memory, one or more functional units coupled to the memory, and a memory stream module coupled to the memory and one or more of the functional units. The memory stream module is operable to receive a plurality of operations associated with the memory and to receive a plurality of operations associated with the one or more functional units. Furthermore, the memory stream module may determine a dependency between the plurality of operations associated with the memory and the plurality of operations associated with the one or more functional units, create a first ordering of the plurality of operations associated with the memory, and create a second ordering of the plurality of operations associate with the one or more functional units based on the dependency and the first ordering of the operations associated with the memory.

In Example 2, in the processor of Example 1, the dependency between the plurality of operations associated with the memory and the plurality of operations associated with the one or more functional units specifies that at least one operation of the plurality of operations associated with the one or more functional units is not to be executed until an operation of the plurality of operations associated with the memory has been executed.

In Example 3, in the processor of any of Examples 1-2, the plurality of operations associated with the memory comprises read and write operations associated with the memory and the plurality of operations associated with the one or more functional units comprises a trigger to execute at least one of the one or more functional units to operate on data stored in the memory.

In Example 4, in the processor of any of Examples 1-3, the write operations associated with the memory stores a control block in the memory and the control block comprises instructions for the operating of the one or more functional units.

In Example 5, in the processor of any of Examples 1-4, the memory is a coherent memory and the one or more functional units are non-coherent (NOCO) functional units.

In Example 6, in the processor of any of Examples 1-5, the memory stream module is further to execute the plurality of operations associated with the memory and the plurality of operations associated with the one or more functional units based on the first ordering and the second ordering.

In Example 7, in the processor of any of Examples 1-6, the memory stream module is further to identify a promotion of a write operation from the plurality of operations associated with the memory, determine a second dependency between the plurality of operations associated with the memory and the plurality of operations associated with the one or more functional units based on the promoted write operation, and modify the second ordering based on the second dependency, wherein the second dependency specifies that at least one of the plurality of operations associated with the one or more functional units is not to be executed until the promoted write operation has been executed.

In Example 8, in the processor of any of Examples 1-7, the first ordering comprises the plurality of operations associated with the memory in sequential order and the second ordering order comprises the plurality of operations associated with the one or more functional units in sequential order.

In Example 9, in the processor of any of Examples 1-8, the first ordering comprises the plurality of operations associated with the memory in an order where a read operation of the plurality of operations associated with the memory may be executed before a write operation of the plurality of operations associated with the memory that is earlier in program order than the read operation. The second ordering comprises the plurality of operations associated with the one or more functional units in sequential order.

In Example 10, a method comprises receiving, by a memory sequence module of a processor, a plurality of operations associated with the memory and a plurality of operations associated with the one or more functional units. A dependency between the plurality of operations associated with the memory and the plurality of operations associated with the one or more functional units may be determined. A first ordering of the plurality of operations associated with the memory and a second ordering of the plurality of operations associated with the one or more functional units based on the dependency and the first ordering of the plurality of operations associated with the memory may be created.

In Example 11, in the method of Example 10, the dependency between the plurality of operations associated with the memory and the plurality of operations associated with the one or more functional units specifies that at least one operation of the plurality of operations associated with the one or more functional units is not to be executed until an operation of the plurality of operations associated with the memory has been executed.

In Example 12, in the method of any of Examples 10-11, wherein the plurality of operations associated with the memory comprises read and write operations associated with the memory and wherein the plurality of operations associated with the one or more functional units comprises a trigger to execute at least one of the one or more functional units to operate on data stored in the memory.

In Example 13, in the method of any of Examples 10-12, the write operations associated with the memory stores a control block in the memory and the control block comprises instructions for the operating of the one or more functional units.

In Example 14, in the method of any of Examples 10-13, the memory is a coherent memory and the one or more functional units are non-coherent (NOCO) functional units.

In Example 15, in the method of any of Examples 10-14, the method further comprises executing, by the memory sequence module, the plurality of operations associated with the memory and the plurality of operations associated with the one or more functional units based on the first ordering and the second ordering.

In Example 16, in the method of any of Examples 10-15, the method further comprises identifying, by the memory sequence module, a promotion of a write operation from the plurality of operations associated with the memory and determining, by the memory sequence module, a second dependency between the plurality of operations associated with the memory and the plurality of operations associated with the one or more functional units based on the promoted write operation. Furthermore, the method may comprise modifying, by the memory sequence module, the second ordering based on the second dependency, wherein the second dependency specifies that at least one of the plurality of operations associated with the one or more functional units is not to be executed until the promoted write operation has been executed.

In Example 17, in the method of any of Examples 10-16, the first ordering comprises the plurality of operations associated with the memory in sequential order and the second ordering order comprises the plurality of operations associated with the one or more functional units in sequential order.

In Example 18, in the method of any of Examples 10-17, the first ordering comprises the plurality of operations associated with the memory in an order where a read operation of the plurality of operations associated with the memory may be executed before a write operation of the plurality of operations associated with the memory that is earlier in program order than the read operation, and the second ordering comprises the plurality of operations associated with the one or more functional units in sequential order.

Various embodiments may have different combinations of the structural features described above. For instance, all optional features of the processors and methods described above may also be implemented with a processor described herein and specifics in the examples may be used anywhere in one or more embodiments.

Example 19 is an integrated circuit comprising a processor core and a memory sequence module. The memory sequence module is to receive a plurality of operations associated with the memory and a plurality of operations associated with the one or more functional units, determine a dependency between the plurality of operations associated with the memory and the plurality of operations associated with the one or more functional units, and create a first ordering of the plurality of operations associated with the memory and a second ordering of the plurality of operations associated with the one or more functional units based on the dependency and the first ordering of the plurality of operations associated with the memory. The plurality of operations associated with the memory and the plurality of operations associated with the one or more functional units may be executed based on the first ordering and the second ordering.

In Example 20, in the integrated circuit of Example 19, the dependency between the plurality of operations associated with the memory and the plurality of operations associated with the one or more functional units specifies that at least one operation of the plurality of operations associated with the one or more functional units is not to be executed until an operation of the plurality of operations associated with the memory has been executed.

In Example 21, in the integrated circuit of any of Examples 19-20, the plurality of operations associated with the memory comprises read and write operations associated with the memory and the plurality of operations associated with the one or more functional units comprises a trigger to execute at least one of the one or more functional units to operate on data stored in the memory.

In Example 22, in the integrated circuit of any of Examples 19-21, the write operations associated with the memory stores a control block in the memory and the control block comprises instructions for the operating of the one or more functional units.

In Example 23, in the integrated circuit of any of Examples 19-22, the memory stream module is further to identify a promotion of a write operation from the plurality of operations associated with the memory, determine a second dependency between the plurality of operations associated with the memory and the plurality of operations associated with the one or more functional units based on the promoted write operation, and modify the second ordering based on the second dependency. The second dependency specifies that at least one of the plurality of operations associated with the one or more functional units is not to be executed until the promoted write operation has been executed.

Various embodiments may have different combinations of the operational features described above. For instance, all optional features of the method described above may also be implemented with respect to a non-transitory computer-readable storage medium. Specifics in the examples may be used anywhere in one or more embodiments.

Example 24 is a non-transitory computer-readable storage medium including instructions that, when executed by a processor, cause the processor to perform the method of Examples 10-18.

Example 25 is a system comprising a system on a chip (SOC) that comprises a plurality of functional units, a memory, and memory stream module, coupled to the functional units, to receive a plurality of operations associated with the memory and a plurality of operations associated with the one or more functional units, determine a dependency between the plurality of operations associated with the memory and the plurality of operations associated with the one or more functional units, create a first ordering of the plurality of operations associated with the memory and a second ordering of the plurality of operations associated with the one or more functional units based on the dependency and the first ordering of the plurality of operations associated with the memory.

In Example 26, the SOC of Example 25 further comprises the subject matter of Examples 1-9.

In Example 27, in the SOC of Example 25, the memory stream module is further operable to perform the subject matter of Examples 10-18.

In Example 28, the SOC of Example 25 further comprises subject matter of Examples 19-23.

Example 29 is an apparatus comprising means for receiving a plurality of operations associated with the memory, means for receiving a plurality of operations associated with the one or more functional units, means for determining a dependency between the plurality of operations associated with the memory and the plurality of operations associated with the one or more functional units, means for creating a first ordering of the plurality of operations associated with the memory, and means for creating a second ordering of the plurality of operations associated with the one or more functional units based on the dependency and the first ordering of the plurality of operations associated with the memory.

In Example 30, the apparatus of Example 29 further comprises the subject matter of any of Examples 1-9 and 20-23.

Example 31 is an apparatus comprising a memory stream module, wherein the memory stream module is configured to perform the method of any of Examples 10-18.

In Example 32, the apparatus of Example 31 further comprises the subject matter of any of Examples 1-9 and 19-28.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to cache memory data compression and decompression in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, and 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:

a memory;

one or more non-coherent functional units coupled to the memory; and a memory stream component, coupled to the memory and the one or more non-coherent functional units, to:

receive a plurality of operations associated with a coherent functional unit;

receive a plurality of operations associated with the one or more non-coherent functional units that are separate from the coherent functional unit, wherein the plurality of operations associated with the coherent functional unit comprises read or write operations associated with the memory that are to be performed by the coherent functional unit, and wherein the plurality of operations associated with the one or more non-coherent functional units comprises a trigger to execute at least one of the one or more non-coherent functional units to operate on data stored in the memory;

determine a dependency between the plurality of operations associated with the coherent functional unit and the plurality of operations associated with the one or more non-coherent functional units;

create a first ordering of the plurality of operations associated with the coherent functional unit; and create a second ordering of the plurality of operations associated with the one or more non-coherent functional units based on the dependency and the first ordering of the plurality of operations associated with the coherent functional unit.

2. The processor of claim 1, wherein the dependency between the plurality of operations associated with the coherent functional unit and the plurality of operations associated with the one or more non-coherent functional units specifies that at least one operation of the plurality of operations associated with the one or more non-coherent functional units is not to be executed until an operation of the plurality of operations associated with the coherent functional unit has been executed.

3. The processor of claim 1, wherein the write operations associated with the coherent functional unit stores a control block in the memory and wherein the control block comprises instructions for the operating of the one or more non-coherent functional units.

4. The processor of claim 1, wherein the memory is a coherent memory.

5. The processor of claim 1, wherein the memory stream component is further to:

execute the plurality of operations associated with the coherent functional unit and the plurality of operations associated with the one or more non-coherent functional units based on the first ordering and the second ordering.

6. The processor of claim 1, wherein the memory stream component is further to:

identify a promotion of a write operation from the plurality of operations associated with the coherent functional unit;

determine a second dependency between the plurality of operations associated with the coherent functional unit and the plurality of operations associated with the one or more non-coherent functional units based on the promoted write operation; and modify the second ordering based on the second dependency, wherein the second dependency specifies that at least one of the plurality of operations associated with the one or more non-coherent functional units is not to be executed until the promoted write operation has been executed.

7. The processor of claim 1, wherein the first ordering comprises the plurality of operations associated with the coherent functional unit in sequential order and the second ordering order comprises the plurality of operations associated with the one or more non-coherent functional units in sequential order.

8. The processor of claim 1, wherein the first ordering comprises the plurality of operations associated with the coherent functional unit in an order where a read operation of the plurality of operations associated with the coherent functional unit is executed before a write operation of the plurality of operations associated with the coherent functional unit that is earlier in program order than the read operation, and wherein the second ordering comprises the plurality of operations associated with the one or more non-coherent functional units in sequential order.

9. A method comprising:

receiving, by a memory stream component of a processor, a plurality of operations associated with a coherent functional unit;

receiving, by the memory stream component, a plurality of operations associated with one or more non-coherent functional units that are separate from the coherent functional unit, wherein the plurality of operations associated with the coherent functional unit comprises read or write operations associated with a memory that are to be performed by the coherent functional unit, and wherein the plurality of operations associated with the one or more non-coherent functional units comprises a trigger to execute at least one of the one or more non-coherent functional units to operate on data stored in the memory;

determining, by the memory stream component, a dependency between the plurality of operations associated with the coherent functional unit and the plurality of operations associated with the one or more non-coherent functional units;

creating, by the memory stream component, a first ordering of the plurality of operations associated with the coherent functional unit; and creating, by the memory stream component, a second ordering of the plurality of operations associated with the one or more non-coherent functional units based on the dependency and the first ordering of the plurality of operations associated with the coherent functional unit.

10. The method of claim 9, wherein the dependency between the plurality of operations associated with the coherent functional unit and the plurality of operations associated with the one or more non-coherent functional units specifies that at least one operation of the plurality of operations associated with the one or more non-coherent functional units is not to be executed until an operation of the plurality of operations associated with the coherent functional unit has been executed.

11. The method of claim 9, wherein the write operations associated with the coherent functional unit stores a control block in the memory and wherein the control block comprises instructions for the operating of the one or more non-coherent functional units.

12. The method of claim 9, wherein the memory is a coherent memory.

13. The method of claim 9, further comprising:

executing, by the memory stream component, the plurality of operations associated with the coherent functional unit and the plurality of operations associated with the one or more non-coherent functional units based on the first ordering and the second ordering.

14. The method of claim 9, further comprising:

identifying, by the memory stream component, a promotion of a write operation from the plurality of operations associated with the coherent functional unit;

determining, by the memory stream component, a second dependency between the plurality of operations associated with the coherent functional unit and the plurality of operations associated with the one or more non-coherent functional units based on the promoted write operation; and modifying, by the memory stream component, the second ordering based on the second dependency, wherein the second dependency specifies that at least one of the plurality of operations associated with the one or more non-coherent functional units is not to be executed until the promoted write operation has been executed.

15. The method of claim 9, wherein the first ordering comprises the plurality of operations associated with the coherent functional unit in sequential order and the second ordering order comprises the plurality of operations associated with the one or more non-coherent functional units in sequential order.

16. The method of claim 9, wherein the first ordering comprises the plurality of operations associated with the coherent functional unit in an order where a read operation of the plurality of operations associated with the coherent functional unit is executed before a write operation of the plurality of operations associated with the coherent functional unit that is earlier in program order than the read operation, and wherein the second ordering comprises the plurality of operations associated with the one or more non-coherent functional units in sequential order.

17. An integrated circuit comprising:

a processor core; and a memory stream component associated with the processor core and to:

receive a plurality of operations associated with a coherent functional unit;

receive a plurality of operations associated with one or more non-coherent functional units that are separate from the coherent functional unit, wherein the plurality of operations associated with the coherent functional unit comprises read or write operations associated with the memory that are to be performed by the coherent functional unit, and wherein the plurality of operations associated with the one or more non-coherent functional units comprises a trigger to execute at least one of the one or more non-coherent functional units to operate on data stored in the memory;

determine a dependency between the plurality of operations associated with the coherent functional unit and the plurality of operations associated with the one or more non-coherent functional units;

create a first ordering of the plurality of operations associated with the coherent functional unit;

create a second ordering of the plurality of operations associated with the one or more non-coherent functional units based on the dependency and the first ordering of the plurality of operations associated with the coherent functional unit; and execute the plurality of operations associated with the coherent functional unit and the plurality of operations associated with the one or more non-coherent functional units based on the first ordering and the second ordering.

18. The integrated circuit of claim 17, wherein the dependency between the plurality of operations associated with the coherent functional unit and the plurality of operations associated with the one or more non-coherent functional units specifies that at least one operation of the plurality of operations associated with the one or more non-coherent functional units is not to be executed until an operation of the plurality of operations associated with the coherent functional unit has been executed.

* * * * *